United States Patent [19]

White et al.

[11] Patent Number: 4,830,738

[45] Date of Patent: May 16, 1989

[54] SEPARATION OF MATTER BY FLOATATION

[75] Inventors: David A. White, London; John M. Taylor, Edenfield, both of United Kingdom

[73] Assignee: British Nuclear Fuels plc, Cheshire, England

[21] Appl. No.: 95,864

[22] Filed: Sep. 14, 1987

[30] Foreign Application Priority Data

Sep. 23, 1986 [GB] United Kingdom ................ 8622843

[51] Int. Cl.⁴ ........................ B03D 1/02; C01G 43/00; C22B 60/02

[52] U.S. Cl. .................................... 209/166; 210/704; 252/61; 423/4; 423/256; 423/261

[58] Field of Search .................... 209/166, 167; 423/3, 423/4, 249, 250, 251, 261, 256; 210/704, 705, 706, 707; 252/61; 75/2

[56] References Cited

U.S. PATENT DOCUMENTS

| | | | |
|---|---|---|---|
| 2,750,254 | 6/1956 | Blake | 209/167 |
| 2,772,142 | 11/1956 | Cummings | 209/167 |
| 3,203,968 | 8/1965 | Sebba | 209/167 |
| 3,240,556 | 3/1966 | Bhappu | 209/166 |

FOREIGN PATENT DOCUMENTS

| | | | |
|---|---|---|---|
| 4953 | 10/1979 | European Pat. Off. | 209/166 |
| 1792675 | 5/1972 | Fed. Rep. of Germany | 209/166 |

*Primary Examiner*—David L. Lacey
*Assistant Examiner*—Thomas M. Lithgow
*Attorney, Agent, or Firm*—Larson and Taylor

[57] ABSTRACT

Matter is floated to the surface of a liquid by bonding ions to the surface of the matter to give the matter a charge, and forming a froth with the aid of a frothing agent having groups of opposite charge to the ions so that the frothing agent bonds to the matter and is carried in the froth to the surface of the liquid. By removing the froth the matter can be separated from any inert matter present in the liquid. The oxidation state of the surface of the matter may be changed before bonding takes place with the ions to one which facilitates that bonding. The matter can be particulate or dissolved ions. For example, uranium dioxide particles are oxidized with hydrogen peroxide, sodium carbonate added to produce a negatively charged uranyl carbonate complex and a froth formed with the aid of cetyl trimethylammonium bromide. Cationic groups in the latter bond to the uranyl carbonate complex causing the uranyl carbonate complex to be concentrated in the froth at the surface of the liquid. The froth is then skimmed off to remove the uranium dioxide particles.

18 Claims, No Drawings

SEPARATION OF MATTER BY FLOATATION

BACKGROUND OF THE INVENTION

This invention relates to the floatation of matter at the surface of a liquid medium to assist its separation and is particularly, but not necessarily exclusively, concerned with the floatation of actinides in magnesium hydroxide based media.

In the reprocessing of nuclear fuel elements it is necessary to first separate the spent fuel from its cladding. For fuel which has been irradiated in the so-called Magnox reactors, the cladding is made from Magnox, a magnesium alloy containing small quantities of aluminium, manganese and zirconium. Once the cladding has been removed it is transferred to concrete silos where it is stored under water. Small quantities of spent fuel matter, that is uranium dioxide and traces of other actinide oxides become associated with the cladding and are therefore transferred to the storage silos.

During prolonged storage under water the cladding reacts with the water to give a magnesium hydroxide based sludge. The sludge also contains the particles of spent fuel that were associated with the cladding. Sludges containing actinides are also encountered in other industries, such as the uranium mining industry. It is desirable to remove the particles of spent fuel and/or actinides from such sludges.

The aim of the present invention is to provide a method of separating matter by floatation.

FEATURES AND ASPECTS OF THE INVENTION

According to the present invention there is provided a method of causing matter to float at the surface of a liquid medium to assist its separation, the method comprising the steps of:

(i) changing the oxidation state of the matter;

(ii) bonding ions to the surface at least of the matter;

(iii) making a mixture comprising the product of step (ii), a liquid medium and a frothing agent for the liquid medium, the frothing agent having one or more groups of opposite charge to the ions of step (ii); and (iv) causing the mixture to froth whereby the frothing agent and the product of step (ii) form a bond and are together concentrated in the froth at the surface of the liquid medium.

Preferably, the froth is removed thereby effecting separation of the matter from any other inert material present in the medium which is not floated in the froth. Further frothing agent may then be added, a froth produced and the froth removed so that substantially all of the matter is removed from the medium.

The ions of step (ii) may be anions, in which case the frothing agent of step (iii) has one or more cationic groups. Alternatively, the ions of step (ii) may be cations, and the frothing agent may have one or more anionic groups.

The oxidation state of the matter may be changed in step (i) to a state which facilitates the bonding of the ions to the matter in step (ii). For example, the oxidation state may be changed by oxidising the matter using oxidants such as hydrogen peroxide, ozone, oxygen-enriched air or potassium permanganate. Alternatively, the oxidation state of the matter may be changed by reduction with, for example, hydroxylamine hydrogen-chloride. The oxidation state may be changed only at the surface of the matter.

The liquid medium may be alkaline, neutral, or mildly acidic (for example ph 3 to 6). For example, the liquid medium may be an alkaline medium based on substantially magnesium hydroxide.

The matter may be particulate or may be dissolved ions. For example, the matter may comprise particles of a metal or an oxide of a metal such, as an actinide or an oxide of an actinide. Typically the matter may comprise uranium or an oxide of uranium, such as uranium dioxide. The matter may also comprise soluble ions such as the uranyl ion.

It is preferable that the matter comprises particles of 150 $\mu m$ in diameter or less.

In the case where the ions in step (ii) are anions, the ions are typically carbonate but other ions such as sulphate, chloride, phosphate, thiocyanate, and anions of carboxylic acids such as citric acid and ethylenediaminetetra-acetic acid may be used. Examples of frothing agents having cationic groups which may be used are cetyl trimethyl ammonium bromide and cetyl pyridinium chloride.

By changing the oxidation state of the matter of the surface of the matter, bonding of the ions to the matter is facilitated. The bonding of the ions to the matter gives the matter a charge which allows the matter to bond to a frothing agent having groups of opposite charge. When a gas such as air is bubbled into the liquid medium the frothing agent produces a froth at the surface of the liquid medium. Since the matter bonds to the frothing agent, the matter is floated to the surface of the liquid medium. Removal of the froth allows the matter to be separated from any species in the liquid which does or do not bond with the ions in step (ii).

An illustrative experiment will now be described by way of example, which will make clear the principles of the invention.

DESCRIPTION OF THE PREFERRED EMBODIMENT

Uranium dioxide powder (1 g) is mixed with 10 g of corroded Magnox (a sludge including magnesium hydroxide) and conditioned overnight in a solution of hydrogen peroxide (6% w/v). This has the effect of oxidising the surface of the uranium dioxide particles present in the powder to uranium trioxide. The solution is filtered and the solid collected, re-bulked in a solution containing sufficient sodium carbonate to give a pH of 8 to 9. After this stage the surface of the particles contain a negatively charged complex of $UO_2(CO_3)_3{}^{4-}$. A solution comprising an excess of cetyl trimethylammonium bromide in alcohol (about 0.0001 M) is then added and air bubbled into the mixture to form a froth. The negatively charged particles of uranium dioxide stick to the positively charged end of the cetyl trimethylammonium bromide and are thus concentrated in the froth, which can be skimmed off the rest of the mixture, leaving behind most of the magnesium hydroxide. Typically 90% of the uranium dioxide particles are removed in about 40% of the water together with 25% of the Magnesium hydroxide.

When applied to the treatment of irradiated nuclear fuel, in particular the Magnox cladding thereof, oxides of actinides, such as uranium dioxide, plutonium dioxide and americium oxide present in the maxnesium hydroxide based sludge, produced during prolonged storage of Magnox fuel cladding under water, are floated. The sludge is first conditioned with a solution of hydrogen peroxide (6% w/v) to oxidise the surface of the actinide particles and then treated with a complexing agent such a citrate, followed by cetyl trimethyl ammonium bromide. Air is bubbled into the mixture to form a froth and float the actinide particles. The froth is then skimmed off to effect separation of the actinide particles from the remainder of the sludge.

The frothing process may be repeated by adding further cetyl trimethylammonium bromide and bubbling air into the mixture. In this way substantially all of actinide particles may be removed from the sludge.

It is envisaged that the floatation process may be used to float uranium dioxide particles in the uranium mixing industry.

It should be appreciated that the floatation process is not limited to use within the nuclear industry.

We claim:

1. A method of causing particulate matter to float at the surface of a liquid medium to assist its separation, the method comprising the steps of:

(i) changing the oxidation state of the surface of the particulate matter;

(ii) bonding ions to the surface of the particulate matter;

(iii) forming a bond between the product of step (ii) and a frothing agent by making a mixture comprising the product of step (ii), a liquid medium and a frothing agent for the liquid medium, the frothing agent having one or more groups of charge opposite to that of the ions of step (ii); and (iv) floating said particulate matter by subjecting the mixture of step (iii) to bubbles thereby producing a froth at the surface of the liquid medium having the particulate matter concentrated in said froth.

2. A method as claimed in claim 1 in which in step (i) the oxidation state is changed by oxidizing the surface of the particulate matter to a state which facilitates the bonding of ions to the particulate matter in step (ii).

3. A method as claimed in claim 2 in which the particulate matter is oxidized using hydrogen peroxide.

4. A method as claimed in claim 1 in which the ions of step (ii) are anions, and in which the frothing agent has one or more cationic groups.

5. A method as claimed in claim 4 in which the ions are selected from the group consisting of carbonate, citrate, ethylene diaminetetra-acetate, cyanide, sulphate, chloride, phosphate and thiocyanate.

6. A method as claimed in claim 4 in which the frothing agent comprises cetyl trimethyl ammonium bromide or cetyl pyridinium chloride.

7. A method as claimed in claim 1 in which the pH of the medium is neutral.

8. A method as claimed in claim 1 in which the pH of the medium is alkaline.

9. A method as claimed in claim 1 in which the liquid medium includes magnesium hydroxide.

10. A method as claimed in claim 1 in which the particulate matter comprises particles of diameter 150 microns or less.

11. A method as claimed in claim 1 in which the matter comprises particles of a metal or an oxide of metal.

12. A method as claimed in claim 1 in which the matter comprises particles of an actinide or an oxide of an actinide.

13. A method as claimed in claim 1 in which the matter comprises particles of uranium or an oxide of uranium.

14. A method of concentrating particles of actinide species by froth flotation, the method comprising the steps of:

(i) oxidizing the surface of the particles;

(ii) bonding anions to the oxidized surface of the particles;

(iii) forming a bond between the product of step (ii) and a frothing agent by making a mixture comprising the product of step (ii), a liquid medium and said frothing agent for said liquid medium, said frothing agent comprising a cationic frothing agent; and (iv) concentrating said particles of actinide species in a froth floating on the surface of the liquid medium by subjecting said mixture to froth flotation.

15. A method as claimed in claim 14 in which in step (i) the surface of the particles is oxidized using hydrogen peroxide.

16. A method as claimed in claim 14 in which the anions are carbonate or citrate ions.

17. A method as claimed in claim 14 in which the frothing agent comprises cetyl trimethyl ammonium bromide or cetyl pyridinium chloride.

18. A method as claimed in claim 14 in which the liquid medium includes magnesium hyroxide.

* * * * *